United States Patent [19]

Takenaga et al.

[11] 4,290,909
[45] Sep. 22, 1981

[54] PROCESS FOR PRODUCING A LITHIUM BORATE THERMOLUMINESCENT AND FLUORESCENT SUBSTANCE

[75] Inventors: Mutsuo Takenaga, Katano; Osamu Yamamoto, Hirakata, both of Japan

[73] Assignee: Matsushita Electric Industrial Co., Ltd., Osaka, Japan

[21] Appl. No.: 61,999

[22] Filed: Jul. 30, 1979

[30] Foreign Application Priority Data

Aug. 3, 1978 [JP] Japan ................................. 53-95322

[51] Int. Cl.³ ............................................. C09K 11/28
[52] U.S. Cl. ............................. 252/301.4 R; 250/337; 250/484
[58] Field of Search ................. 252/301.4 R; 250/337, 250/484

[56] References Cited

U.S. PATENT DOCUMENTS 3,554,920  1/1971  Becker .......................... 252/301.4 R
3,573,221  3/1971  Brunskill ....................... 252/301.4 R

OTHER PUBLICATIONS

Schulman et al., "U.S. Atomic Energy Comm., Symposium", Series 8, Conf-650637, (1967), pp. 113–117.
Sekine, "Denki Kagaku", 1974, 42(8), pp. 404–407.

*Primary Examiner*—Jack Cooper
*Attorney, Agent, or Firm*—Stevens, Davis, Miller & Mosher

[57] ABSTRACT

A process for producing a lithium borate thermoluminescent and fluorescent substance containing lithium borate as its main component which comprises heat-treating a mixture of $Li_2B_4O_7$ powder and an activator element compound at a temperature under and neighboring the melting point of $Li_2B_4O_7$, to provide a highly sensitive fluorescent substance which has good adherence to the substrate of a dosimeter.

7 Claims, 7 Drawing Figures

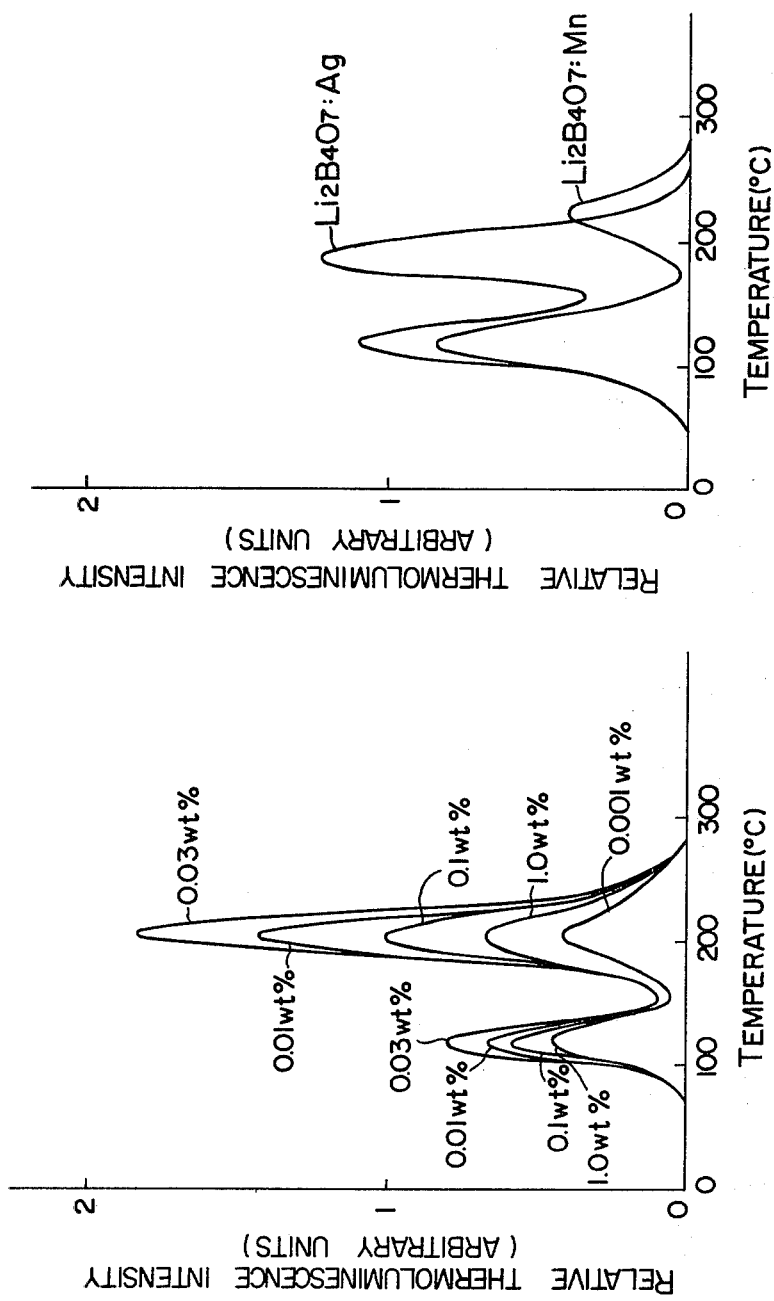

× 100

× 100

PROCESS FOR PRODUCING A LITHIUM BORATE THERMOLUMINESCENT AND FLUORESCENT SUBSTANCE

The present invention relates to a process for producing a lithium borate thermoluminescent and fluorescent substance. More particularly, the present invention relates to a process for producing a lithium borate thermoluminescent and fluorescent substance, each particle of which has a spherical shape and provides a good adherence on the substrate in a thin film. The thermoluminescent material consisting essentially of lithium borate has an effective atomic number, $\overline{Z_E}$, of 7.2 which is very close to that of a living body ($\overline{Z_E}=7.4$), and the said material is very suitable for measuring the absorbed dose of radiation on a living body such as the human body etc. Heretofore, the fluorescent substances $Li_2B_4O_7$:Mn and $Li_2B_4O_7$:Ag have been known as ones known based on lithium borate, and these have been put to actual use to determine the absorbed dose of radiation. The glow curve of these fluorescent substance has two peaks in the neighbourhood of 100° C. and 200° C. As the glow peak neighbouring 100° C. is diminished when the substance is left to stand as it is for several hours at a room temperature after exposure to radiation, the measuring of the dosage is usually conducted by using the glow peak of 200° C. These fluorescent substances have addiction sensitivity over 50 mR. Therefore, further improvement on their sensitivity has been sought in order to make it possible to use them to measure low level radiation dose.

With regard to the process for producing $Li_2B_4O_7$ thermoluminescent and fluorescent substances, Schulman disclosed a basic process [J. H. Schulman, R. D. Kirk and E. J. West, U.S. Atomic Energy Commission, Symposium Series 8, CONF-650637 (1967)]. That is, the process which uses lithium carbonate ($Li_2CO_3$) and boric acid ($H_3BO_3$ or $B_2O_3$) as the starting materials, comprises mixing said raw materials, melting the obtained mixture at a temperature of 950° C. which is higher than 917° C. (the melting point of $Li_2B_4O_7$ cooling the product to room temperature, and then subjecting the product to heat-treatment at a temperature of 650° C. for the purpose of recrystallization. The obtained massive substance is ground and classified according to the desired order of particle size. At the time of grinding, the surfaces of the ground fluorescent particles are roughened and the optical scattering is ready to take place by virtue of their surface roughness. The obtained fluorescent substances have a variety of shapes and sizes and many of them have especially angular and projecting shapes as shown in FIG. 6. In order to intensify the response of the dosimeter to a photon in the low energy range of 10 to 50 keV which is in the same sensitivity range as the response of living bodies to a photon, it is necessary to membranize the dosimeter, that is, to form it in a thin film. However, in this form, its sensitivity would become insufficient, since the amount of fluorescent substance coated on the dosimeter would be decreased. Accordingly, in order to improve the sensitivity of the dosimeter, it is necessary to adhere the fluorescent substance particles strongly on the surface of the dosimeter substrate by using as little binder as possible to decrease the optical absorption and scattering by the binder as much as possible. However such a construction induces easy removal of the particles from the substrate, for example, by a simple mechanical vibration or shock, because, in many cases, the projecting parts of the fluorescent particles formed by the conventional method tend to adhere to the substrate. Such being the case, the appearance of a fluorescent substance having an almost spherical shape has been eagerly sought in order to achieve a good adherence of fluorescent particulates on the substrate.

The object of the present invention is to provide a process for producing a $Li_2B_4O_7$, thermoluminescent and fluorescent substance having an almost spherical shape, showing good adherence to the dosimeter substrate and further having a high sensitivity to radiation.

FIG. 1 is a glow curves diagram of thermoluminescent and fluorescent substances produced according to the method disclosed in Example 1.

FIG. 2 is a glow curves diagram of thermoluminescent and fluorescent substances obtained by a conventional method.

Figure 4:
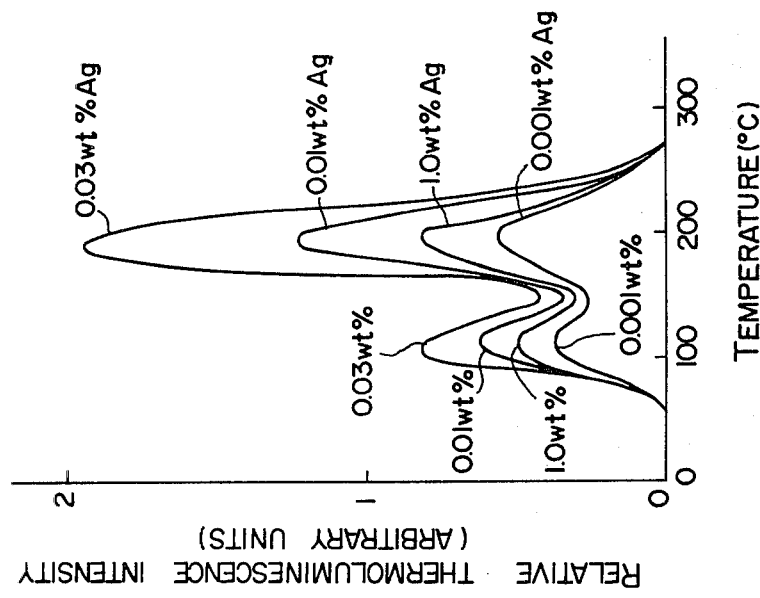
FIG. 4 is a glow curves diagram of a thermoluminescent and fluorescent substance prepared by the method shown in Example 3.

The heat-treatment of $Li_2B_4O_7$ at a temperature slightly lower than the melting point thereof causes the diffusion of the activator elements added later to $Li_2B_4O_7$ into the crystal interior as well as the construction, denseness and recrystallization of crystals due to diffusion or vaporization and condensation of ions or atoms on the surface of $Li_2B_4O_7$ mother crystals and volume diffusion and sintering and the like through the inner parts of the crystals to make it possible to obtain dense and clear crystals having an almost spherical form from the raw materials of $Li_2B_4O_7$ powder which is porous, and opaque and has many projecting parts. The $Li_2B_4O_7$ prepared according to the present invention demonstrates a better adherence to the substrate of the dosimeter and a smaller delamination from the substrate by mechanical vibration as compared with $Li_2B_4O_7$ powder prepared by the conventional method and gives a $Li_2B_4O_7$ thermoluminescent and fluorescent substance whose sensitivity to radiation is several times or more than 10 times that of the conventional one. Furthermore, according to the present invention, a dosimeter almost having a desired form can be prepared by heat-treating a pre-formed disc or pellet shaped from the powder obtained by the present process without any need for a hot-press method etc. used in the conventional method.

As regards the heat-treatment condition mentioned above, the temperature is preferably in the range of about 850° to about 917° C., and most preferably in a range of about 905° to about 917° C., just under the melting point of $Li_2B_4O_7$ (917° C.). The heat-treating time varies somewhat in accordance with the temperature used. However, treatment for a short time would result in satisfactory product just under the melting point of $Li_2B_4O_7$. That is treatment from several minutes to shorter than one hour in the neighbourhood of 910° C. and a heat treatment for shorter than one hour to several hours in the neighbourhood of 900° C. would produce good results.

Next, a process for producing thermoluminescent materials according to the present invention will be discussed in the following.

To the raw lithium borate ($Li_2B_4O_7$) powder, is added a solution of the activator compound such as cupric chloride ($CuCl_2.2H_2O$) or silver nitrate etc. in acetone or alcohol, and the mixture is then stirred and dried while mixing. Then, the said lithium borate powder containing the activator compound is heat-treated in air in a crucible at a temperature of 850° to 917° C. with the aid of a conventional tubular electric furnace. The raw material powder of lithium borate contracts and a parts of the raw powder adhere to each other. Then the heated mass is rapidly cooled to room temperature and crushed to particles having a desired size and sieved. At that time, the heated mass is very easily crushed, because the heated powder particles adhere to each other only in one part thereof. Further each of the crushed particles retains the form shaped in the course of heating as it is, namely they are almost in a spherical shape. Therefore, the surfaces of the particulates are not roughened during the crushing step and so the surfaces are smooth.

The suitable particle size of the raw lithium borate is of the order of about 200μ. If the particles have a particle size smaller than this, the radiation sensitivity diminishes to some degree, but those particles can be used for a dosimeter. If the particles have a particle size larger than this, the particles having a stable sensitivity can be obtained by annealing them for a long time at 400° C., though the sensitivity is somewhat decreased in the course of annealing at 400° C., which is carried out to eliminate thermoluminescence signal.

The activator compound added to lithium borate is used in an amount of 0.001 to 1.0% by weight based on the weight of lithium borate, and the amount of 0.01 to 0.1% by weight is most preferable.

Subsequently, a test result of the radiation properties of the present thermoluminescent and fluorescent substance will be discussed in detail in the following.

The glow curves of the fluorescent substance having added 0.03% by weight of copper as an activator element has two glow peaks at 120° and 205° C. and is characterized by the fact that the main glow peak at 205° C. is fairly high. This characteristic of the present fluorescent substance is very different from that of the conventional fluorescent substances such as $Li_2B_4O_7$:Mn and $Li_2B_4O_7$:Ag and will have a great influence on other radiation properties. For example, the fading property thereof is less than 10% per month at room temperature and is considerably improved on that of the conventional one so much as to attain a level for practical use. The improvement in the radiation properties can also be obtained at the time of adding silver as activator element to the fluorescent substance.

Figure 5:
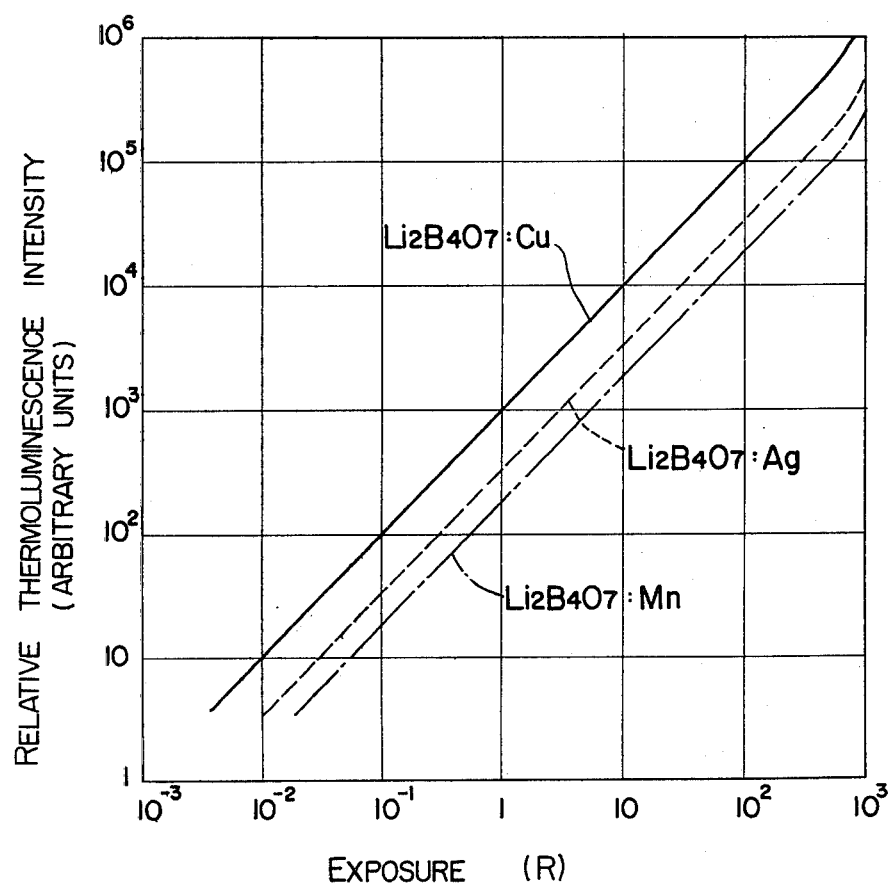
FIG. 5 is a diagram showing the relation between the $\gamma$-ray dose and the relative thermoluminescence intensity of the substances prepared by the present method and the conventional one.
Figure 6:
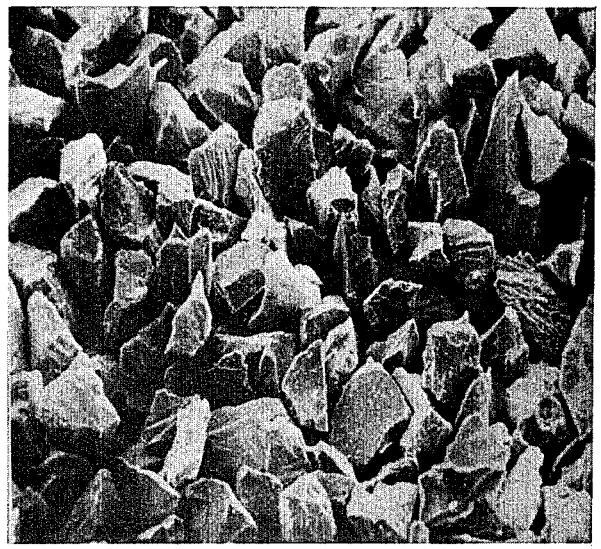
FIG. 6 is a microscopic photograph of thermoluminescent and fluorescent substance prepared by a conventional method through a scanning type electron-microscope. (Magnification=1:100).
Figure 7:
FIG. 7 is a microscopic photograph of a thermoluminescent and fluorescent substance prepared by the present method through a scanning type electron-microscope. (Magnification=1:100)

A typical measuring method of radiation using the present thermoluminescent substance will be illustrated in the following. At first, a dosimeter is provided for, by using the powder obtained by the present process in itself or preparing an element by coating the powder on heat-resistant resin or glass. After exposing to radiation, luminescence from the dosimeter is received in a suitable manner and an integral photo-current is read. The quantity of thermoluminescence radiation obtained by this is in good proportion to the exposure dose on the dosimeter in a range of 3 mR to 300 R as shown in FIG. 5. Therefore, the radiation quantity from the radiation source can be measured on the basis of this proportionality.

Higher radiation sensitivity of about 3 to 10 times that of the conventional fluorescent substance can be obtained by the thermoluminescent substance according to the present process as compared with the conventional ones such as $Li_2B_4O_7$:Mn (radiation sensitivity of 100 mR) and $Li_2B_4O_7$:Ag (radiation sensitivity of 30 mR). Further, the detection limit of 3 mR can be attained by the present invention. This value surpasses the sensitivity limit of film badge type dosimeters now in use and verifies that the present fluorescent substance can fully be useful to such applications as the personnel dosimetry and the like.

The present invention will be discussed by way of an example only for illustration without any intention of imposing any limitation on the present invention. It should be understood that the present invention is to be contrued only on the basis of the appended claims.

EXAMPLE 1

Lithium borate ($Li_2B_4O_7$) powder was sieved with a stainless steel sieve and there were collected the particles in a range of 149 to 210μ. To the sieved lithium borate was added a solution of cupric chloride ($CuCl_2.2H_2O$) in acetone in a concentration of 0.001 to 1.0% by weight of copper based on weight of lithium borate, and mixed thoroughly until dry. After that, the mixture was placed in a crucible made of platinum and heated for 30 minutes at a temperature of 913° C. in a tublar electric furnace. Then the crucible was taken out of the furnace and cooled to a room temperature. After cooling, the heated content was crushed into a particle size of 70 to 300 mesh and sieved. The glow curve of a sample of the obtained particulates is shown in FIG. 1. The sample has two peaks in glow curve at 120° C. and 205° C. The maximum glow is given at an additional amount of 0.03% by weight of copper. In this case, the sample reveals about 3 to 10 times glow as compared with the conventional $Li_2B_4O_7$:Mn and $Li_2B_4O_7$:Ag fluorescent substance, the glow curve of which is shown in FIG. 2. Under the addition concentration outside of 0.03% by weight, the radiation sensitivity becomes lower to some degree, but remains suitable for a dosimeter.

EXAMPLE 2

Figure 3:
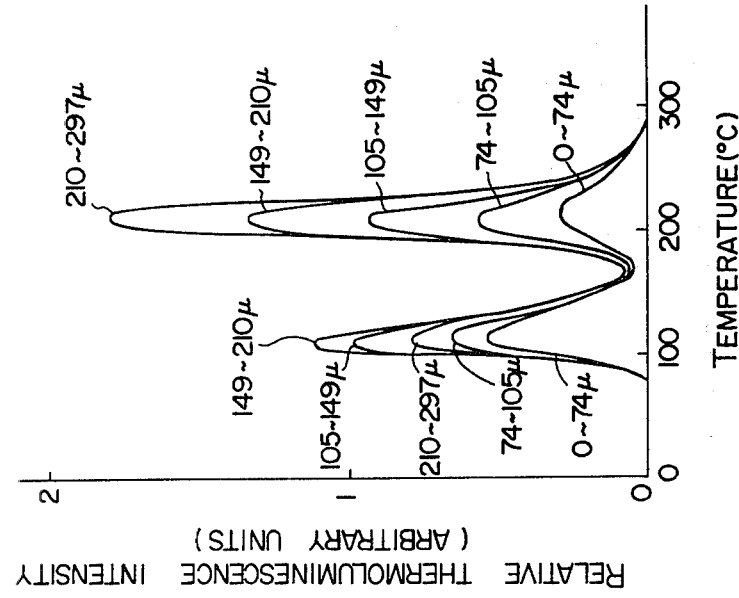
FIG. 3 is a glow curves diagram of thermoluminescent and fluorescent substances obtained by the method shown in Example 2.

Lithium borate ($Li_2B_4O_7$) powder was classified into five particle size classes: namely 0–74μ, 74–105μ, 105–149μ, 149–210μ and 210–297μ. To the powder of each class was respectively added a solution of $CuCl_2.2H_2O$ in acetone as activator in the concentration of 0.06% by weight of copper based on lithium borate. These samples were heat-treated, crushed and sieved in the same manner as in Example 1. The glow curves of each samples are shown in FIG. 3. As seen from FIG. 3, the sample having the particle size of 210–297μ shows the highest glow quantity. Other samples show lower glow quantities but they remains suitable for use as a dosimeter.

EXAMPLE 3

Samples were prepared according to a method similar to that of Example 1 by using Ag activator in place of Cu activator used in Example 1, by adding a solution of $AgNO_3$ in acetone to seived lithium borate so as to provide 0.001–1.0% by weight of Ag concentration. The samples were heat-treated, crushed and sieved in the same manner as in Example 1. The glow curves of the samples are shown in FIG. 4. As seen from FIG. 4, the maximum glow is obtained at a Ag concentration of 0.03% by weight and it shows three times the glow compared with that of the conventional ones. Sensitivities of samples having AG concentration outside of 0.03% by weight decreased to some degree, but remains suitable for use as a dosimeter.

What is claimed is:

1. Process for producing a lithium borate ($Li_2B_4O_7$) thermoluminescent and fluorescent substance of substantially spherical form containing lithium borate ($Li_2B_4O_7$) as the main component which comprises mixing $Li_2B_4O_7$ powder with an activator element compound and heat-treating the resultant mixture in air at a temperature of about 850° C. to just below the melting point of $Li_2B_4O_7$ for a time sufficient to diffuse the activator element into the crystal interior of the $Li_2B_4O_7$ powder and effect formation of $Li_2B_4O_7$ thermoluminescent substance of substantially spherical form.

2. Process for producing a lithium thermoluminescent and fluorescent substance according to claim 1, wherein pre-sieved and classified $Li_2B_4O_7$ powder is used.

3. Process for producing a lithium borate thermoluminescent and fluorescent substance according to claim 1, wherein a solvent which dissolves the activator element compound and does not dissolve or swell $Li_2B_4O_7$ powder is used, to add said activator element compound to $Li_2B_4O_7$ powder.

4. Process for producing a lithium borate thermoluminescent and fluorescent substance according to claim 1 wherein the heat treated mixture is crushed to particles of a desired size.

5. A process according to claim 1, wherein the temperature is about 905° C. to about 917° C.

6. A process according to claim 1, wherein the activator element is selected from the group consisting of copper and silver.

7. A process according to claim 6, wherein the activator element compound is present in an amount of 0.001 to 1.0% by weight based on the weight of the lithium borate.

* * * * *